United States Patent
Iizuka

(10) Patent No.: US 10,087,313 B2
(45) Date of Patent: Oct. 2, 2018

(54) RUBBER COMPOSITION FOR TIRE TREADS

(71) Applicant: The Yokohama Rubber Co., LTD., Minato-ku, Tokyo (JP)

(72) Inventor: Yusuke Iizuka, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/533,319

(22) PCT Filed: Dec. 2, 2015

(86) PCT No.: PCT/JP2015/083908
§ 371 (c)(1),
(2) Date: Jun. 5, 2017

(87) PCT Pub. No.: WO2016/088811
PCT Pub. Date: Jun. 9, 2016

(65) Prior Publication Data
US 2017/0362415 A1    Dec. 21, 2017

(30) Foreign Application Priority Data
Dec. 5, 2014 (JP) .................... 2014-246488

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/035* (2013.01)

(58) Field of Classification Search
USPC .......................... 524/404, 435, 436, 492, 495
See application file for complete search history.

(56) References Cited

U.S. PATENT DOCUMENTS

| | | |
|---|---|---|
| 2013/0059965 A1 | 3/2013 | Hirose |
| 2014/0155520 A1 | 6/2014 | Takeda |

FOREIGN PATENT DOCUMENTS

| | | |
|---|---|---|
| JP | S63-099252 | 4/1988 |
| JP | 2007-161819 | 6/2007 |
| JP | 2011-246561 | 12/2011 |
| JP | 2014-189698 | 10/2014 |
| JP | 2016-003280 | 1/2016 |
| WO | WO 2011/148965 | 12/2011 |
| WO | WO 2013/008927 | 1/2013 |
| WO | WO 2015/194549 | 12/2015 |

OTHER PUBLICATIONS

International Search Report for International Application No. PCT/JP2015/083908 dated Mar. 8, 2016, 4 pages, Japan.

*Primary Examiner* — Terressa M Boykin
(74) *Attorney, Agent, or Firm* — Thorpe North & Western

(57) ABSTRACT

A rubber composition contains: a diene rubber; 1 to 25 parts by weight of aromatic modified terpene resin; 80 to 150 parts by weight of silica; 5 to 50 parts by weight of carbon black; an oil component; and 0.1 to 20 wt. % of the weight of the silica of alkyltriethoxysilane having an alkyl group having 3 to 20 carbons, the diene rubber containing 10 to 30 wt. % of natural rubber, 10 to 30 wt. % of solution polymerized styrene butadiene rubber having a styrene unit content of 30 to 40 wt. % and 80 to 40 wt. % of emulsion polymerized styrene butadiene rubber, and a ratio of a total amount of an oil-extending component in the solution polymerized styrene butadiene rubber and/or the emulsion polymerized styrene butadiene rubber, the aromatic modified terpene resin, and the oil component to a weight of the natural rubber being 3.0 to 4.0.

5 Claims, 1 Drawing Sheet

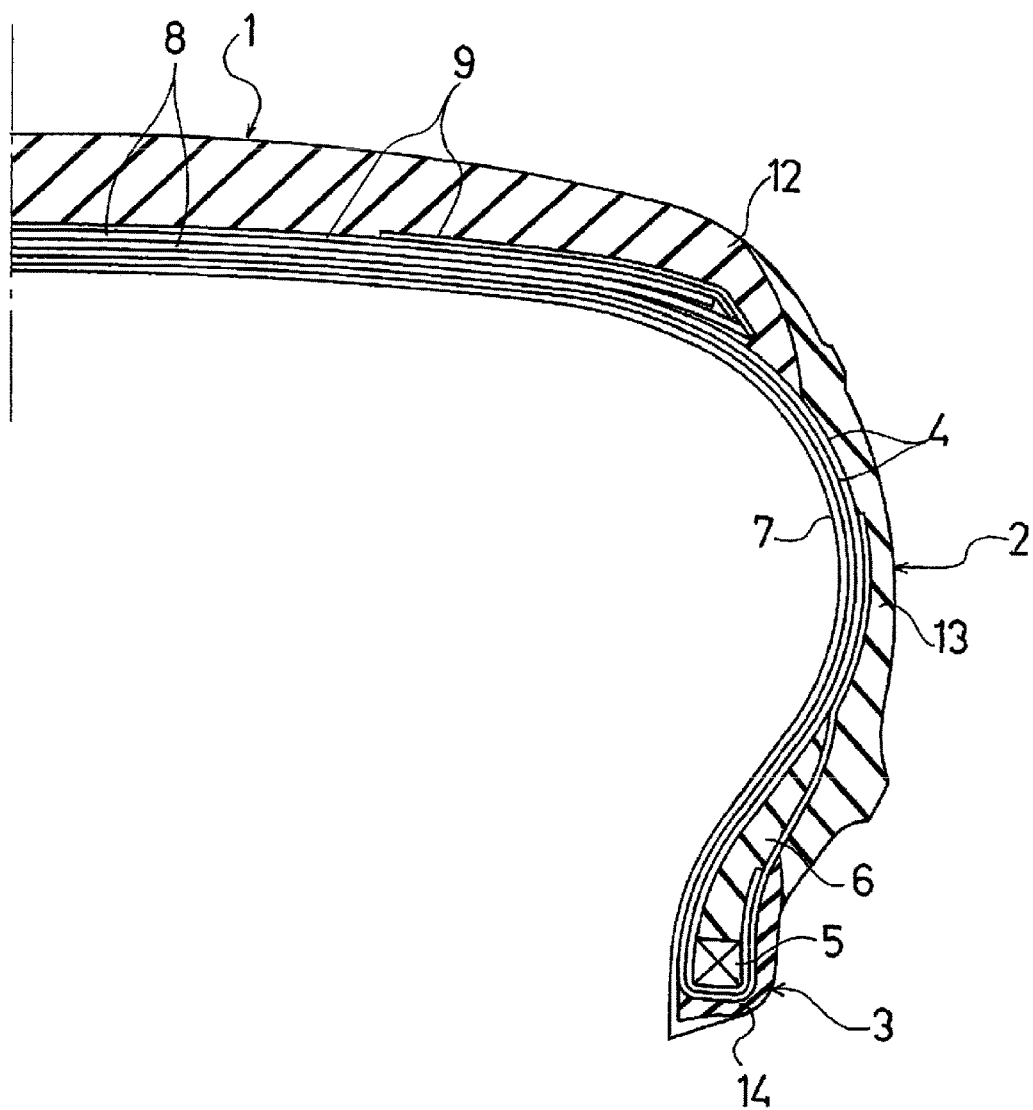

RUBBER COMPOSITION FOR TIRE TREADS

TECHNICAL FIELD

The present technology relates to a rubber composition for tire treads that enhances processability, grip performance, and wear resistance beyond conventional levels.

BACKGROUND ART

Pneumatic tires for passenger vehicles for use in high performance vehicles are required to have dry grip performance, wet grip performance, wear resistance, and low rolling resistance at the same time at a high level. For example, to achieve high grip performance, a styrene butadiene rubber having a high glass transition temperature is blended or a rubber composition containing a large amount of inorganic filler having a small particle size is used. Unfortunately, when such a rubber composition is used, rolling resistance becomes greater even though the grip performance can be enhanced. Furthermore, when a large amount of silica is blended to a rubber composition to make rolling resistance smaller, there is a problem in that wear resistance may be deteriorated.

Japanese Unexamined Patent Application Publication No. 2011-246561A proposes a rubber composition having excellent low heat build-up, wear resistance, and wet grip performance by improving dispersibility of silica by blending a silica to a diene rubber in which an emulsion polymerized styrene butadiene rubber, a terminal-modified solution polymerized styrene butadiene rubber, and a natural rubber are compounded while the weight ratio thereof is limited. However, required levels of enhancement of the grip performance and the wear resistance expected by prospective consumers are even higher, and it is also important to enhance processability to stably produce high quality pneumatic tires. Further enhancement of the balance of these has been demanded.

SUMMARY

The present technology provides a rubber composition for tire treads by which processability, grip performance, and wear resistance are improved to or beyond conventional levels.

The rubber composition for tire treads of the present technology that achieves the object described above is a rubber composition containing: a diene rubber; from 1 to 25 parts by weight of an aromatic modified terpene resin; from 80 to 150 parts by weight of a silica; from 5 to 50 parts by weight of a carbon black; and an oil component, per 100 parts by weight of the diene rubber; and from 0.1 to 20 wt. % of the weight of the silica of an alkyltriethoxysilane having an alkyl group having from 3 to 20 carbons, the diene rubber containing from 10 to 30 wt. % of a natural rubber, from 10 to 30 wt. % of a solution polymerized styrene butadiene rubber having a styrene unit content of 30 to 40 wt. % and from 80 to 40 wt. % of an emulsion polymerized styrene butadiene rubber, and a ratio of a total amount $W_{oil}$ of an oil-extending component contained in the solution polymerized styrene butadiene rubber and/or the emulsion polymerized styrene butadiene rubber, the aromatic modified terpene resin, and the oil component to a weight $W_{NR}$ of the natural rubber ($W_{oil}/W_{NR}$) being from 3.0 to 4.0.

The rubber composition for tire treads of the present technology can enhance processability, grip performance, and wear resistance to or beyond conventional levels because the rubber composition contains, a diene rubber containing from 10 to 30 wt. % of a natural rubber, from 10 to 30 wt. % of a solution polymerized styrene butadiene rubber having a high styrene unit content, and from 80 to 40 wt. % of an emulsion polymerized styrene butadiene rubber, an aromatic modified terpene resin, a silica, a carbon black, an oil component, and an alkyltriethoxysilane; a ratio of a total amount $W_{oil}$ of an oil-extending component contained in the solution polymerized styrene butadiene rubber and/or the emulsion polymerized styrene butadiene rubber, the aromatic modified terpene resin, and the oil component to a weight $W_{NR}$ of the natural rubber ($W_{oil}/W_{NR}$) being from 3.0 to 4.0.

In the present technology, the CTAB (cetyltrimethylammonium bromide) specific surface area of the silica is preferably set to 180 to 250 m²/g. Furthermore, the total compounded amount of the silica and the carbon black is preferably set to greater than 140 parts by weight and 200 parts by weight or less.

The pneumatic tire in which the rubber composition for tire treads of the present technology is used has grip performance and wear resistance that are enhanced beyond conventional levels, and thus the high quality pneumatic tire can be produced stably.

BRIEF DESCRIPTION OF DRAWING

FIG. 1 is a partial cross-sectional view in a tire meridian direction illustrating an example of an embodiment of a pneumatic tire in which the rubber composition for tire treads of the present technology is used.

DETAILED DESCRIPTION

FIG. 1 illustrates an example of an embodiment of a pneumatic tire in which the rubber composition for tire treads is used. The pneumatic tire has a tread portion 1, sidewall portions 2, and bead portions 3.

In FIG. 1, in a pneumatic tire, two carcass layers 4, formed by arranging reinforcing cords which extend in a tire radial direction, are disposed extending between the left and right side bead portions 3 in a tire circumferential direction at a predetermined pitch and embedding the reinforcing cords in a rubber layer. Both ends of the carcass layer 4 are made to sandwich a bead filler 6 around a bead core 5 that is embedded in the bead portions 3 and are folded back in a tire axial direction from the inside to the outside. An innerliner layer 7 is disposed inward of the carcass layer 4. Two layers of belt layer 8, formed by arranging reinforcing cords which extend inclined in the tire circumferential direction, are disposed on an outer circumferential side of the carcass layer 4 of the tread portion 1 in the tire axial direction at a predetermined pitch and embedding these reinforcing cords in a rubber layer. The reinforcing cords of the two layers of belt layer 8 are inclined with respect to the tire circumferential direction, and the direction of the cords of the different layers have an opposite orientation and cross each other. A belt cover layer 9 is disposed on an outer circumferential side of the belt layer 8. The tread portion 1 is formed from a tread rubber layer 12 on an outer circumferential side of the belt cover layer 9. The tread rubber layer 12 is preferably formed from the rubber composition for tire treads of the present application. A side rubber layer 13 is disposed outward of the carcass layers 4 in each side wall portion 2, and a rim cushion rubber layer 14 is provided outward of the portion of each carcass layer 4 that is folded back around the bead portion 3.

In the rubber composition for tire treads of the present technology, the rubber component is formed from a diene rubber, and the total amount of a natural rubber, a solution polymerized styrene butadiene rubber (hereinafter, referred to as "S-SBR") and an emulsion polymerized styrene butadiene rubber (hereinafter, referred to as "E-SBR") is 100 wt. %.

In the present technology, a natural rubber is included at 10 to 30 wt. % per 100 wt. % of the diene rubber. By compounding the natural rubber, the grip performance can be enhanced while the wear resistance is significantly enhanced. When the content of the natural rubber is less than 10 wt. %, the effect of enhancing the wear resistance cannot be exhibited sufficiently. Furthermore, when the content of the natural rubber is greater than 30 wt. %, dry grip performance deteriorates. The content of the natural rubber is preferably from 10 to 20 wt. %, and more preferably from 15 to 20 wt. %.

In the present technology, the styrene unit content of the S-SBR is from 30 to 40 wt. %, and preferably from 32 to 38 wt. %. When the styrene unit content of the S-SBR is less than 30 wt. %, rigidity and strength of the rubber composition are insufficient, and thus the wear resistance and the wet grip performance cannot be sufficiently enhanced. When the styrene unit content of the S-SBR is greater than 40 wt. %, the fuel economy performance deteriorates. Note that the styrene unit content of the S-SBR is measured by infrared spectroscopy (Hampton method).

In the present technology, from 10 to 30 wt. % of the S-SBR is contained per 100 wt. % of the diene rubber. When the content of the S-SBR is less than 10 wt. %, fuel economy performance deteriorates. When the content of the S-SBR is greater than 30 wt. %, dry grip performance deteriorates. The content of the S-SBR is preferably from 15 to 30 wt. %, and more preferably from 20 to 30 wt. %.

The rubber composition for tire treads of the present technology contains from 80 to 40 wt. % of the E-SBR per 100 wt. % of the diene rubber. When the content of the E-SBR is less than 40 wt. %, wet grip performance deteriorates. When the content of the E-SBR is greater than 80 wt. %, fuel economy performance deteriorates. The content of the E-SBR is preferably from 50 to 70 wt. %, and more preferably from 50 to 60 wt. %.

In the rubber composition for tire treads of the present technology, wet grip performance can be enhanced by compounding an aromatic modified terpene resin. Examples of the aromatic modified terpene resin include terpene resins obtained by polymerizing a terpene, such as α-pinene, β-pinene, dipentene, and limonene, and an aromatic compound, such as styrene, phenol, α-methylstyrene, and vinyl toluene.

The compounded amount of the aromatic modified terpene resin is from 1 to 25 parts by weight, and preferably from 10 to 20 parts by weight, per 100 parts by weight of the diene rubber. When the compounded amount of the aromatic modified terpene resin is less than 1 part by weight, wet grip performance cannot be sufficiently enhanced. When the compounded amount of the aromatic modified terpene resin is greater than 25 parts by weight, fuel economy performance deteriorates.

In the rubber composition for tire treads of the present technology, wet grip performance can be enhanced by compounding a silica. The compounded amount of the silica is from 80 to 150 parts by weight, and preferably from 100 to 150 parts by weight, per 100 parts by weight of the diene rubber. When the compounded amount of the silica is less than 80 parts by weight, wet grip performance cannot be sufficiently enhanced. When the compounded amount of the silica is greater than 150 parts by weight, fuel economy performance deteriorates.

The CTAB specific surface area of the silica is preferably from 180 to 250 m$^2$/g, and more preferably from 200 to 230 m$^2$/g. When the CTAB specific surface area of the silica is less than 180 m$^2$/g, wet grip performance deteriorates. When the CTAB specific surface area of the silica is greater than 250 m$^2$/g, fuel economy performance deteriorates. The CTAB specific surface area of the silica is determined in accordance with JIS (Japanese Industrial Standard) K6217-3:2001.

The silica used in the present technology needs to be a silica having the characteristics described above and can be selected appropriately from among commercially available products. In addition, the silica may be produced using conventional methods so as to have the above-mentioned characteristics. Types of silica that can be used include wet method silica, dry method silica, and surface treated silica.

The rubber composition for tire treads of the present technology contains a carbon black together with the silica. By blending the carbon black, high wear resistance and steering stability can be achieved. The compounded amount of the carbon black is from 5 to 50 parts by weight, and preferably from 10 to 30 parts by weight, per 100 parts by weight of the diene rubber. When the compounded amount of the carbon black is less than 5 parts by weight, wear resistance and steering stability cannot be sufficiently enhanced. Furthermore, when the compounded amount of the carbon black is greater than 50 parts by weight, processability deteriorates.

The total compounded amount of the silica and the carbon black is preferably greater than 140 parts by weight but 200 parts by weight or less, more preferably from 140 to 170 parts by weight, per 100 parts by weight of the diene rubber. When the total amount of the silica and the carbon black is 140 parts by weight or less, grip performance and wear resistance may not be sufficiently enhanced. Furthermore, when the total amount of the silica and the carbon black is greater than 200 parts by weight, viscosity becomes high and processability may deteriorate.

Another inorganic filler besides the silica and the carbon black can be further compounded. Examples of other inorganic fillers include clay, talc, calcium carbonate, mica, and aluminum hydroxide. However, the compounded amount of the other inorganic fillers is in a range that does not prevent achieving the object of the present technology.

In the rubber composition of the present technology, a silane coupling agent is preferably compounded together with the silica, and this enables enhancement of the dispersibility of the silica and makes the reinforcing properties for the diene rubber even higher. The compounded amount of the silane coupling agent is preferably from 3 to 15 wt. %, and more preferably from 5 to 12 wt. %, relative to the compounded amount of the silica. In cases where the compounded amount of the silane coupling agent is less than 3 wt. % of weight of the silica, the effect of enhancing silica dispersibility may not be sufficiently achieved. Furthermore, when the compounded amount of the silane coupling agent is greater than 15 wt. %, the silane coupling agents undergo condensation with each other, and the desired effect may not be achieved.

The silane coupling agent is not particularly limited, but is preferably a sulfur-containing silane coupling agent. Examples thereof include bis-(3-triethoxysilylpropyl)tetrasulfide, bis-(3-triethoxysilylpropyl)disulfide, 3-trimethoxysilylpropyl benzothiazole tetrasulfide, γ-mercaptopropyltriethoxysilane, 3-octanoylthiopropyl triethoxysilane, and derivatives thereof. Examples of the derivative include NXT-Z (manufactured by Momentive Performance Materials Inc.).

By blending an alkyltriethoxysilane having an alkyl group having from 3 to 20 carbons, the rubber composition for tire treads of the present technology can suppress aggregation of the silica and increase in the viscosity of the rubber composition and can achieve even better processability, wet performance, and wear resistance.

The alkyltriethoxysilane has an alkyl group having from 3 to 20 carbons, and preferably an alkyl group having from 7 to 10 carbons. Examples of the alkyl group having from 3 to 20 carbons include a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group. Among these, from the perspective of miscibility with the diene rubber, an octyl group or a nonyl group is more preferable.

The compounded amount of the alkyltriethoxysilane is from 0.1 to 20 wt. %, and preferably from 1 to 10 wt. %, relative to the compounded amount of the silica. When the compounded amount of the alkyltriethoxysilane is less than 0.1 wt. %, the effect of making viscosity low while ensuring the wet performance and wear resistance cannot be achieved. Furthermore, when the compounded amount of the alkyltriethoxysilane is greater than 20 wt. %, wear resistance may deteriorate.

The rubber composition for tire treads of the present technology contains an appropriate amount of an oil component. Examples of the oil component include aroma oil, and process oil. The compounded amount of the oil component is selected depending on the relationship of weight ratio of the total compounded amount of the oil-extending component contained in the S-SBR and/or the E-SBR, the aromatic modified terpene resin, and the oil component to the compounded amount of the natural rubber. That is, when the total compounded amount of the oil-extending component contained in the S-SBR and/or the E-SBR, the aromatic modified terpene resin, and the oil component is defined as $W_{oil}$ and when the compounded amount of the natural rubber is defined as $W_{NR}$, the ratio ($W_{oil}/W_{NR}$) needs to be from 3.0 to 4.0. When the ratio ($W_{oil}/W_{NR}$) is less than 3.0, grip performance cannot be sufficiently achieved. Furthermore, when the ratio ($W_{oil}/W_{NR}$) is greater than 4.0, wear resistance cannot be sufficiently achieved. The ratio ($W_{oil}/W_{NR}$) is preferably from 3.2 to 3.8, and more preferably from 3.4 to 3.6.

In addition to the compounding agents described above, the rubber composition for tire treads may also contain various types of additives that are commonly used in rubber compositions for tires, such as vulcanization and crosslinking agents, vulcanization accelerators, anti-aging agents, plasticizers, and processing aids. These additives may be kneaded according to any common method to form the rubber composition and may be used in vulcanization or crosslinking.

The compounded amount of these additives may be any conventional amount, as long as the object of the present technology is not impaired. Such a rubber composition can be produced by mixing the components described above using a publicly known rubber kneading machine, such as a Banbury mixer, a kneader, and a roll.

The rubber composition for tire treads of the present technology can be suitably used in pneumatic tires, and in tire tread portions in particular. A pneumatic tire including this rubber composition can achieve excellent wear resistance and can enhance tire durability in addition to achieving excellent wet grip performance and dry grip performance. Furthermore, since the viscosity is low and excellent processability is achieved, high quality pneumatic tires can be stably produced.

The present technology is further described below using examples. However, the scope of the present technology is not limited to these examples.

Examples

Each of 16 types of rubber compositions for tire treads (Standard Example, Examples 1 to 7, and Comparative Examples 1 to 8) was prepared according to the formulations shown in Tables 1 and 2 with the compounding agents shown in Table 3 used as common components. With the exception of the sulfur and the vulcanization accelerator, the components were kneaded in a 1.7 L sealed mixer for 5 minutes. The mixture was then extruded as a master batch and cooled at room temperature, the sulfur and the vulcanization accelerator were added, and the mixture was then kneaded in a 1.7 L sealed mixer. Note that, in Tables 1 and 2, since the S-SBR 1, S-SBR 2, and E-SBR contained 37.5 parts by weight of oil-extending component per net amount of 100 parts by weight of the rubber, each row of the compounded amounts shows the actual compounded amount as well as the net compounded amount of the SBR excluding the oil-extending component in parentheses. Note that the amounts of the compounding agents shown in Table 3 are shown in terms of part by weight relative to 100 parts by weight of the diene rubbers shown in Tables 1 and 2 (net rubber amounts).

The total amount of the oil-extending component in the S-SBR1, the S-SBR 2, and the E-SBR, the aromatic modified terpene resin ("terpene resin" in the tables), and the aroma oil are shown in the rows of "total amount of oils Woil, part by weight" in Tables 1 and 2. Furthermore, the ratio (Woil/Wnr) of the total amount of oils (Woil) to the compounded amount of the natural rubber (Wnr) is shown in the rows of "ratio Woil/Wnr". Furthermore, the total compounded amount of the silica and the carbon black (CB) is shown in the rows of "silica+CB, part by weight".

The Mooney viscosities of the obtained 16 types of the rubber compositions for tire treads were evaluated by the method described below.

Mooney Viscosity

The Mooney viscosity of the obtained rubber composition was measured in accordance with JIS K6300 using a Mooney viscometer with an L-type rotor (diameter: 38.1 mm, thickness: 5.5 mm) under the conditions of a preheating time of 1 minute, a rotor rotation time of 4 minutes, 100° C., and 2 rpm. The obtained results are shown in the rows of "processability" in Tables 1 and 2 as index values, with the index value of Standard Example expressed as an index of 100. A smaller index value indicates smaller viscosity and superior processability.

The obtained 16 types of rubber compositions for tire treads were press-vulcanized for 20 minutes at 160° C. in a mold with a predetermined shape to produce vulcanized rubber samples. The obtained vulcanized rubber samples were used to evaluate the wear resistance and wet performance by the methods described below. Furthermore, a pneumatic tire was vulcanization-molded to evaluate the dry grip performance and steering stability by the methods described below.

Wear Resistance

The amount of wear of the obtained vulcanized rubber sample was measured in accordance with JIS K6264, using a Lambourn abrasion test machine (manufactured by Iwamoto Seisakusho Co. Ltd.) under the following conditions: temperature: 20° C.; load: 39 N; slip rate: 30%; time: 4 minutes. The obtained results are shown in the rows of "wear resistance" in Tables 1 and 2 as index values, with the reciprocal of the value of Standard Example expressed as an index of 100. A larger index value indicates superior wear resistance.

Wet Grip Performance

The wet grip performance of the obtained vulcanized rubber sample was evaluated based on the loss tangent tan δ (0° C.), which is a known indicator of wet grip performance. The loss tangent tan δ was measured using a viscoelasticity spectrometer (manufactured by Toyo Seiki Seisaku-sho, Ltd.) under the following conditions: initial strain; 10%; amplitude: ±2%; frequency: 20 Hz; and temperature: 0° C. and 60° C. The obtained tan δ (0° C.) results are shown in the "wet performance" rows of Tables 1 and 2 as index values, with the value of Standard Example expressed as an index of 100. A larger index value indicates a larger tan δ (0° C.) and superior wet grip performance.

Dry Grip Performance

Pneumatic tires having a tire size of 195/65R15, in which each tire tread portion was formed from each of the obtained 16 types of the rubber compositions for tire treads, were vulcanization-molded. The obtained tires were assembled on standard rims (rims of 195/65R15), inflated to an air pressure of 250 kPa, and mounted on 16 vehicles of the same type. The 16 vehicles traveled on a dry road surface with relatively less roughness, and braking distances for the case where the vehicles were decelerated from 100 km/hr to 50 km/hr were evaluated, thereby evaluating the dry grip performances. The obtained results are shown in the "dry performance" rows of Tables 1 and 2 as index values, with the value of Standard Example expressed as an index of 100. A larger index value indicates superior dry grip performance.

Steering Stability

Pneumatic tires having a tire size of 195/65R15, in which each tire tread portion was formed from each of the obtained 16 types of the rubber compositions for tire treads, were vulcanization-molded. The obtained tires were assembled on standard rims (rims of 195/65R15), inflated to an air pressure of 250 kPa, and mounted on 16 vehicles of the same type. The 16 vehicles traveled on a dry road surface with relatively less roughness, and response when the steering wheel was turned was subjected to sensory evaluation to evaluate the steering stability by five-grade evaluation with the rating of 3 being passing. The results are shown in "steering stability" rows in Tables 1 and 2. A larger rating indicates superior steering stability.

TABLE 1

|  |  | Standard Example | Example 1 | Example 2 | Example 3 |
|---|---|---|---|---|---|
| NR (Wnr) | Part by weight | 15 | 15 | 15 | 15 |
| S-BBR1 | Part by weight | 37.5 | 37.5 | 37.5 | 37.5 |
|  |  | (30) | (30) | (30) | (30) |
| S-BBR2 | Part by weight |  |  |  |  |
| E-SBR | Part by weight | 75.63 | 75.63 | 75.63 | 75.63 |
|  |  | (55) | (55) | (55) | (55) |
| Silica 1 | Part by weight | 115 | 115 |  |  |
| Silica 2 | Part by weight |  |  | 115 | 130 |
| CB | Part by weight | 20 | 20 | 20 | 20 |
| Coupling agent | Part by weight | 6.9 | 6.9 | 6.9 | 7.8 |
| Alkylsilane | Part by weight | 5.0 | 5.0 | 5.0 | 5.0 |
| Terpene resin | Part by weight |  | 10 | 10 | 20 |
| Aroma oil | Part by weight | 22 | 12 | 12 | 2 |
| (Total amount of oils Woil, part by weight) |  | (50.1) | (50.1) | (50.1) | (50.1) |
| (Ratio Woil/Wnr) |  | (3.34) | (3.34) | (3.34) | (3.34) |
| (Silica + CB, part by weight) |  | (135) | (135) | (135) | (150) |
| Processability | Index value | 100 | 85 | 94 | 98 |
| Wear resistance | Index value | 100 | 102 | 102 | 104 |
| Wet performance | Index value | 100 | 105 | 105 | 110 |
| Dry performance | Index value | 100 | 101 | 105 | 107 |
| Steering stability | Rating | 3 | 3 | 4 | 4 |

|  |  | Example 4 | Example 5 | Example 6 | Example 7 |
|---|---|---|---|---|---|
| NR (Wnr) | Part by weight | 20 | 15 | 15 | 15 |
| S-BBR1 | Part by weight | 31.25 | 12.5 | 37.5 | 37.5 |
|  |  | (25) | (10) | (30) | (30) |
| S-BBR2 | Part by weight |  |  |  |  |
| E-SBR | Part by weight | 75.63 | 103.13 | 75.63 | 75.63 |
|  |  | (55) | (75) | (55) | (55) |
| Silica 1 | Part by weight | 115 | 115 | 115 | 130 |
| Silica 2 | Part by weight |  |  |  |  |
| CB | Part by weight | 20 | 20 | 30 | 20 |
| Coupling agent | Part by weight | 6.9 | 6.9 | 6.9 | 7.8 |
| Alkylsilane | Part by weight | 5.0 | 5.0 | 5.0 | 5.0 |
| Terpene resin | Part by weight | 10 | 10 | 10 | 10 |

TABLE 1-continued

| Aroma oil | Part by weight | 19 | 12 | 12 | 12 |
|---|---|---|---|---|---|
| (Total amount of oils Woil, part by weight) | | (60.9) | (52.6) | (50.1) | (50.1) |
| (Ratio Woil/Wnr) | | (3.04) | (3.51) | (3.34) | (3.34) |
| (Silica + CB, part by weight) | | (135) | (135) | (145) | (150) |
| Processability | Index value | 89 | 87 | 96 | 97 |
| Wear resistance | Index value | 110 | 103 | 105 | 106 |
| Wet performance | Index value | 103 | 107 | 104 | 105 |
| Dry performance | Index value | 100 | 106 | 108 | 107 |
| Steering stability | Rating | 3 | 4 | 4 | 4 |

TABLE 2

| | | Comparative Example 1 | Comparative Example 2 | Comparative Example 3 | Comparative Example 4 |
|---|---|---|---|---|---|
| NR (Wnr) | Part by weight | | 15 | 15 | 15 |
| S-BBR1 | Part by weight | 37.5 | 37.5 | 37.5 | 43.75 |
| | | (30) | (30) | (30) | (35) |
| S-BBR2 | Part by weight | | | | |
| E-SBR | Part by weight | 96.25 | 75.63 | 75.63 | 82.5 |
| | | (70) | (55) | (55) | (60) |
| Silica 1 | Part by weight | 115 | 160 | 75 | 115 |
| Silica 2 | Part by weight | | | | |
| CB | Part by weight | 20 | 60 | 60 | 20 |
| Coupling agent | Part by weight | 6.9 | 9.6 | 4.5 | 6.9 |
| Alkylsilane | Part by weight | 5.0 | 5.0 | 5.0 | 5.0 |
| Terpene resin | Part by weight | 10 | 10 | 10 | 10 |
| Aroma oil | Part by weight | 6.4 | 20 | 12 | 16 |
| (Total amount of oils Woil, part by weight) | | (50.2) | (58.1) | (50.1) | (57.3) |
| (Ratio Woil/Wnr) | | — | (3.88) | (3.34) | (3.82) |
| (Silica + CB, part by weight) | | (135) | (220) | (135) | (135) |
| Processability | Index value | 92 | 150 | 95 | 96 |
| Wear resistance | Index value | 90 | 110 | 90 | 105 |
| Wet performance | Index value | 102 | 120 | 90 | 95 |
| Dry performance | Index value | 97 | 110 | 95 | 102 |
| Steering stability | Rating | 3 | 4 | 2 | 3 |

| | | Comparative Example 5 | Comparative Example 6 | Comparative Example 7 | Comparative Example 8 |
|---|---|---|---|---|---|
| NR (Wnr) | Part by weight | 15 | 15 | 15 | 15 |
| S-BBR1 | Part by weight | 37.5 | | 37.5 | 37.5 |
| | | (30) | | (30) | (30) |
| S-BBR2 | Part by weight | | 30 | | |
| E-SBR | Part by weight | 75.63 | 75.63 | 75.63 | 75.63 |
| | | (55) | (55) | (55) | (55) |
| Silica 1 | Part by weight | 115 | 115 | 115 | 115 |
| Silica 2 | Part by weight | | | | |
| CB | Part by weight | 20 | 20 | 20 | 20 |
| Coupling agent | Part by weight | 6.9 | 6.9 | 6.9 | 6.9 |
| Alkylsilane | Part by weight | | 5.0 | 5.0 | 5.0 |
| Terpene resin | Part by weight | 10 | 10 | 10 | 10 |
| Aroma oil | Part by weight | 16 | 16 | 0 | 22 |
| (Total amount of oils Woil, part by weight) | | (54.1) | (46.6) | (38.1) | (60.1) |
| (Ratio Woil/Wnr) | | (3.61) | (3.11) | (2.54) | (4.01) |
| (Silica + CB, part by weight) | | (135) | (135) | (135) | (135) |
| Processability | Index value | 130 | 105 | 105 | 95 |
| Wear resistance | Index value | 105 | 103 | 106 | 90 |
| Wet performance | Index value | 97 | 96 | 95 | 105 |
| Dry performance | Index value | 101 | 94 | 96 | 104 |
| Steering stability | Rating | 3 | 3 | 3 | 3 |

Note that the types of raw materials used in Tables 1 and 2 are as described below.

NR: Natural rubber, SIR-20

S-SBR 1: Solution polymerized styrene butadiene rubber; Tufdene F3420, manufactured by Asahi Kasei Chemicals Corporation; styrene unit content: 36 wt. %; oil extended product containing 25.0 parts by weight of oil per 100 parts by weight of rubber component S-SBR 2: Solution polymerized styrene butadiene rubber; Tufdene 1000R, manufactured by Asahi Kasei Chemicals Corporation; styrene unit content: 18.5 wt. %; non-oil-extended product (oil content: 0 parts by weight)

E-SBR: Emulsion polymerized styrene butadiene rubber; Nipol 9458, manufactured by Zeon Corporation; oil extended product containing 37.5 parts by weight of oil per 100 parts by weight of rubber component Silica 1: 1165MP, manufactured by Solvay Corporation; CTAB specific surface area: 180 m$^2$/g Silica 2: 9000GR, manufactured by Evonik Degussa; CTAB specific surface area: 200 m²/g CB: Carbon black; N234, manufactured by Cabot Japan K.K.

Coupling agent: Sulfur-containing silane coupling agent; Si69, manufactured by Evonik Degussa Alkylsilane: Octyltriethoxysilane; KBE-3083, manufactured by Shin-Etsu Chemical Co., Ltd.

Terpene resin: Aromatic modified terpene resin; YS Polyster T145, manufactured by Yasuhara Chemical Co., Ltd.; softening point: 145° C.

Aroma oil: Extract No. 4S, manufactured by Showa Shell Sekiyu K.K.

TABLE 3

| Common formulation of rubber composition | |
|---|---|
| Zinc oxide | 3.0 Part by weight |
| Stearic acid | 2.0 Part by weight |
| Sulfur | 1.0 Part by weight |
| Vulcanization accelerator | 2.0 Part by weight |

The types of raw materials used as per Table 3 are shown below.

Zinc oxide: Zinc Oxide #3, manufactured by Seido Chemical Industry Co., Ltd.

Stearic acid: Stearic acid YR, manufactured by NOF Corporation

Sulfur: Oil-treated sulfur, manufactured by Karuizawa Refinery Ltd.

Vulcanization accelerator: NOCCELER CZ-G, manufactured by Ouchi Shinko Chemical Industrial Co., Ltd.

As is clear from Table 1, it was confirmed that the rubber compositions for tire treads of Examples 1 to 7 maintained and/or enhanced processability (Mooney viscosity), wear resistance, wet grip performance (tan δ at 0° C.), dry grip performance, and steering stability.

As is clear from Table 2, with the rubber composition of Comparative Example 1 which contained no natural rubber, wear resistance and dry grip performance deteriorated.

With the rubber composition of Comparative Example 2, processability deteriorated since the compounded amount of the silica was greater than 150 parts by weight and the compounded amount of the carbon black was greater than 50 parts by weight.

With the rubber composition of Comparative Example 3, wear resistance, wet grip performance, dry grip performance, and steering stability deteriorated since the compounded amount of the silica was less than 80 parts by weight and the compounded amount of the carbon black was greater than 50 parts by weight.

With the rubber composition of Comparative Example 4, wet grip performance deteriorated since the compounded amount of the S-SBR 1 was greater than 30 parts by weight.

With the rubber composition of Comparative Example 5, processability and wet grip performance deteriorated since alkylsilane was not compounded.

With the rubber composition of Comparative Example 6, dry grip performance and wet grip performance deteriorated since the styrene unit content of the S-SBR 2 was less than 30 wt. %.

With the rubber composition of Comparative Example 7, dry grip performance and wet grip performance deteriorated since the ratio ($W_{oil}/W_{NR}$) of the total amount $W_{oil}$ of the oil-extending component contained in the S-SBR 1 and the E-SBR, the aromatic modified terpene resin, and the oil component to the weight $W_{NR}$ of the natural rubber was less than 3.0.

With the rubber composition of Comparative Example 8, wear resistance deteriorated since the ratio ($W_{oil}/W_{NR}$) of the total amount $W_{oil}$ of the oil-extending component contained in the S-SBR 1 and the E-SBR, the aromatic modified terpene resin, and the oil component to the weight $W_{NR}$ of the natural rubber was greater than 4.0.

The invention claimed is:

1. A rubber composition for tire treads comprising:
   a diene rubber;
   from 1 to 25 parts by weight of an aromatic modified terpene resin;
   from 80 to 150 parts by weight of a silica;
   from 5 to 50 parts by weight of a carbon black;
   an oil component, per 100 parts by weight of the diene rubber; and
   from 0.1 to 20 wt. % of the weight of the silica of an alkyltriethoxysilane having an alkyl group having from 3 to 20 carbons,
   the diene rubber containing from 10 to 30 wt. % of a natural rubber, from 10 to 30 wt. % of a solution polymerized styrene butadiene rubber having a styrene unit content of 30 to 40 wt. %, and from 80 to 40 wt. % of an emulsion polymerized styrene butadiene rubber, and
   a ratio of a total amount $W_{oil}$ of an oil-extending component contained in the solution polymerized styrene butadiene rubber and/or the emulsion polymerized styrene butadiene rubber, the aromatic modified terpene resin, and the oil component to a weight $W_{NR}$ of the natural rubber ($W_{oil}/W_{NR}$) being from 3.0 to 4.0.

2. The rubber composition for tire treads according to claim 1, wherein a CTAB specific surface area of the silica is from 180 to 250 m²/g.

3. The rubber composition for tire treads according to claim 1, wherein a total compounded amount of the silica and the carbon black is greater than 140 parts by weight and 200 parts by weight or less.

4. A pneumatic tire comprising the rubber composition for tire treads according to claim 1.

5. The rubber composition for tire treads according to claim 2, wherein a total compounded amount of the silica and the carbon black is greater than 140 parts by weight and 200 parts by weight or less.

* * * * *